Nov. 20, 1956 W. N. WAINWRIGHT ET AL 2,771,328
PISTON RING GROOVE PROTECTOR
Filed Feb. 27, 1956
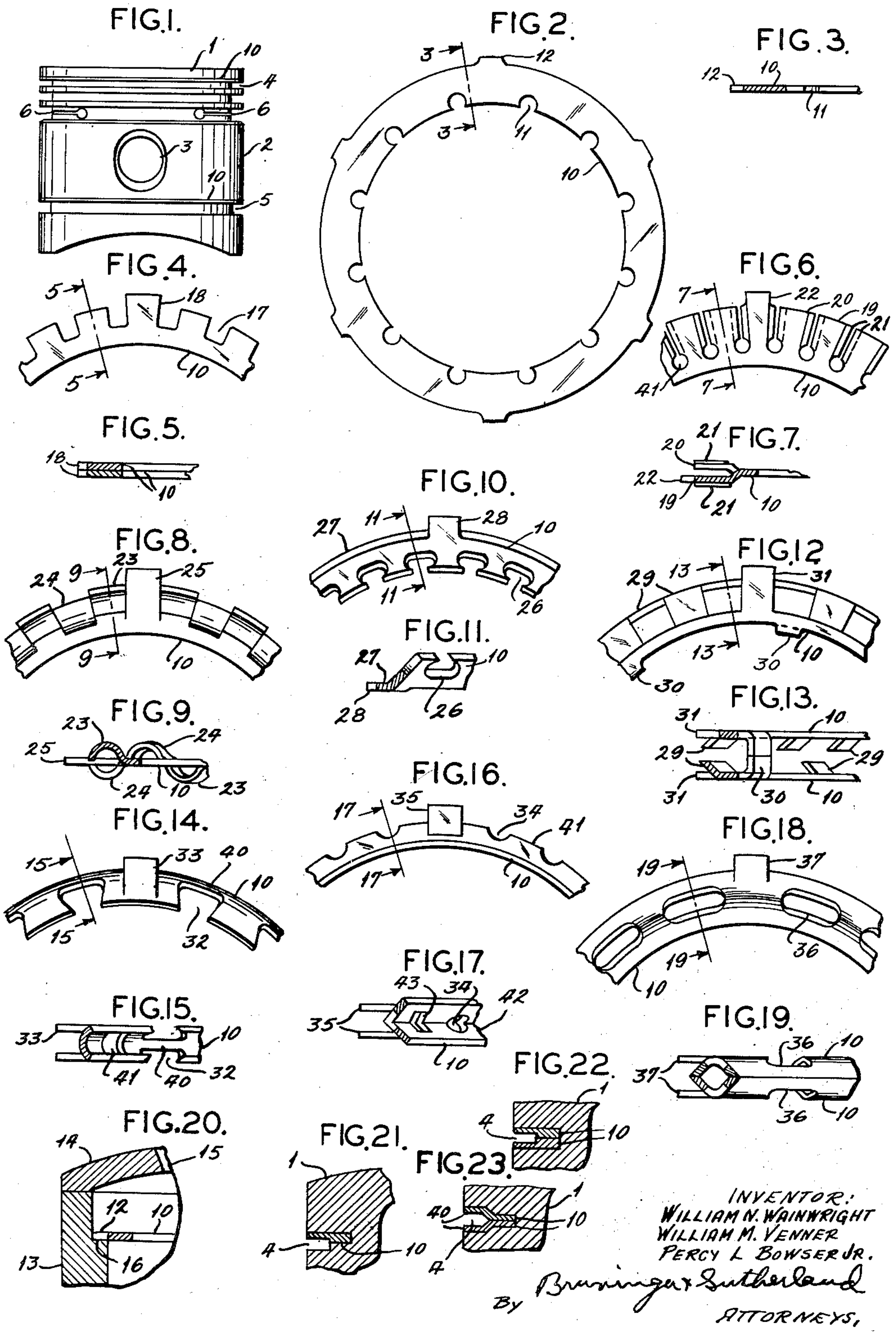
FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23
INVENTOR:
WILLIAM N. WAINWRIGHT
WILLIAM M. VENNER
PERCY L. BOWSER JR.
By Brumbaugh & Sutherland
ATTORNEYS, 2,771,328

PISTON RING GROOVE PROTECTOR

William N. Wainwright, Kirkwood, William M. Venner, Brentwood, and Percy L. Bowser, Jr., Ladue, Mo., assignors to Sterling Aluminum Products, Inc., St. Louis, Mo., a corporation of Missouri Application February 27, 1956, Serial No. 567,942

14 Claims. (Cl. 309—14)

This application is a continuation in part of applications Serial No. 315,518, filed October 18, 1952, now abandoned, and Serial No. 453,486, filed September 1, 1954, now abandoned.

This invention relates to pistons, and more particularly pistons whose body is of aluminum and its alloys, although such pistons are also constructed of magnesium and its alloys. In these alloys, however, the aluminum or magnesium constitutes the preponderant part of the alloy. In those of aluminum alloys, the alloying elements are copper, usually up to 10%; nickel, usually up to 19%; magnesium, usually up to 1%; and silicon, usually up to about 12%. For brevity, all such pistons will be referred to as aluminum pistons.

An aluminum piston, more particularly one of the trunk type having wrist pin bosses, the head, which is of smaller diameter than the skirt is provided with ring-receiving grooves, into which are placed packing rings usually of iron or steel. During the reciprocation of the piston, particularly in automobile types, these reciprocations are exceedingly rapid, causing the packing ring to hammer against the faces of the groove, particularly the top face, during the power stroke. This results in a hammering action on the ring face, which makes the rings loose, and, therefore, subject to leakage of gases past the ring, which is, for necessity's sake, separated from the bottom of the groove, and which is sufficiently loose to permit the ring to spring out. Moreover, dust, oil, and chemicals, products of combustion, collect between the ring and the groove. Although aluminum alloys containing hardening elements such as copper, magnesium and nickel to some extent lessen the wear due to hammering action, it is by no means remedied. Accordingly, pistons have to be recmachined to take oversized rings.

While it has been suggested to cast an aluminum piston body over a ferrous band, viz.: of a metal harder than aluminum, and to provide such band with packing ring-receiving grooves, such a band is difficult to anchor, and in most cases will work loose so that there will be leakage around that band.

One of the objects of this invention, therefore, is to provide a piston in which the above described drawbacks are practically overcome.

Further objects will appear from the detailed drawings, in which:

Figure 1 is a side elevation of a piston embodying this invention;

Figure 2 is a face view of an annular protector disc emobdying this invention;

Figure 3 is a section on the line 3—3 of Figure 2;

Figures 4, 6, 8, 10, 12, 14, 16 and 18 are views similar to Figure 2, but showing only segments of various annular protcetor discs embodying this invention;

Figures 5, 7, 9, 11, 13, 15, 17 and 19 are, respectively, sections on the lines 5—5, 7—7, 9—9, 11—11, 13—13, 15—15, 17—17 and 19—19 of Figures 4, 6, 8, 10, 12, 14, 16 and 18, respectively;

Figure 20 is a section through a casting mold with the protector disc of Figures 2 and 3 in position for casting;

Figure 21 is a section through the piston showing the machining of the piston packing groove with the protector disc of Figures 2 and 3 therein in position to protect the groove;

Figure 22 is a view similar to Figure 21, but showing the machining of the piston packing groove with the protector disc of Figures 4 and 5 therein in position to protect the groove; and Figure 23 is a view similar to Figure 22, showing a variation of the protector disc of Figures 4 and 5.

Referring now to the accompanying drawings, Figure 1 shows a standard aluminum piston having a head 1 and a skirt 2 provided with inwardly extending wrist pin bosses (not shown), the wrist pin receiving openings being shown at 3. The head, which is slightly smaller than the skirt, is provided with packing ring-receiving grooves, one of which is shown at 4. There may also be a packing ring-receiving groove 5 in the bottom of the skirt. Into the grooves 4 and 5 are placed the packing rings which, as noted above, are usually of iron or steel. The head may be separated from the skirt by one or more slots 6, and there may also be a vertical slot (not shown) connected to the slot 6 and extended downwardly, usually to the bottom of the piston.

An annular piston packing protecting disc is generally shown at 10 in Figure 1, and also in the other figures, and this disc may be provided for any and all packing ring-receiving grooves 4 and also for the bottom grooves 5. The disc may be constructed singly to protect one side of a groove, or in duplex to protect both sides of a groove. The protector comprises generally, a continuous annular disc of a metal harder than aluminum and extending around the piston body adjacent a packing ring-receiving groove, and the outer margin of the disc extends into the groove to face the same. The disc has recesses extending circumferentially therealong and therehrough, that is, those recesses are of sufficient dimensions circumferentially and radially of the disc to permit molten aluminum to flow therethrough to cast-anchor the disc in the aluminm body. The disc may be made of steel or cast iron, but economically of a cold rolled steel. However, the disc may be made of an alloy whose coefficient of expansion is substantially equal to the coefficient of expansion of the usual aluminum alloy. Such an alloy shown in the Koch United States Patent No. 1,946,081 as containing nickel, copper, magnesium, silicon, chromium and carbon. However, other metals and alloys may be used which are ferrous in character, viz., of a metal or alloy harder than aluminum. One of these is aluminum bronze. The disc may be made in any suitable manner, as by stamping.

Referring to Figures 2 and 3, the disc 10 is provided with recesses 11 along its inside margin and these recesses contract towards the inner margin so as to form in effect dovetails with the piston metal cast therein. The outside margin of the disc may be provided with a number of extensions or tabs 12. In order to cast-anchor the disc in the piston body, it is placed in a mold 13, Figure 20, which, as usual, is made of iron or steel and of separable parts, and provided with a top 14 having a pouring opening 15. The mold is machined to provide a shoulder 16 to receive the extensions or tabs 12 of the disc 10; this shoulder 16 being so positioned that the outer margin of the disc will extend into the to-be-formed groove subsequently formed in the piston. After the aluminum piston body 1 has been cast over the disc 10, and as shown in Figure 21, the piston is machined diametrically and in so doing the tabs or extensions 12 are cut off. The packing ring-receiving groove 4 is now formed and in doing so will partially machine the disc so as to protect one side wall of the groove.

In Figures 4 and 5, the protector may be made up of two discs 10 which may, for convenience, be spot-welded together. In this embodiment the outer margin of each disc has the recesses 17 formed therein and into which the aluminum can flow. One or both of these discs may also be provided with extensions 18 for positioning the discs in the mold, as shown in Figure 20. After the piston body is cast around the disc so as to flow into the recesses 17, the piston is machined diametrically so as to cut off the tabs 18 and the groove 4 is then machined as shown in Figure 22, so that the outer margins of the disc will protect both walls of the groove. In Figure 23, a pair of discs 10 thinner than those of Figures 4 and 5, have their outer margins 40 displaced axially of the piston.

In Figures 6 and 7, disc 10 has displaced therefrom alternate parts 19 and 20, and the edges of these extensions may be further pressed outwardly axially of the piston to form wings 21. Recesses 41 may be provided in the disc intermediate the margins. The disc may also be provided with extensions 22 to position the same in the mold in the same way as in Figure 20. After the aluminum body has been cast over the disc and machined diametrically to remove the extensions 22, the packing ring-receiving groove is formed between the parts 19 and 20 so that again both walls of the groove will be protected.

In Figures 8 and 9, the disc 10 has displaced therefrom alternate parts 23 and 24, the disc being deflected axially towards and extending into the groove to face the same, while the disc is provided with extensions 25 to position the same in the mold. The alternate displacement of parts 23 and 24 will form in effect recesses at the outer margin through which the aluminum can flow to anchor the same in the piston body. After the piston body has been cast around the disc, and after the piston has been machined diametrically to remove the extensions 25, the groove is cut between the terminals of the parts 23 and 24 which then protect the groove.

In Figures 10 and 11, the disc 10 is provided at its inner margin with recesses 26 and these recesses again contract towards the inner margin so as to form in effect dovetails with the piston metal cast therein. The outer margin of the disc is deflected latterly so as to form an outer margin 27 which is provided with extensions 28 to position the disc in the mold, with the outer margin extending into the to-be-formed groove, so that upon machining of the piston and the formation of the groove, the outer margin will face the side wall of the groove.

In Figures 12 and 13, there are two discs 10 of like construction, each provided with laterally formed alternate parts 29 extending around the disc and forming recesses along the outer margins. Each disc is also formed with alternate inwardly extending parts 30 at spaced points around the disc, the disc being deflected axially towards and extending into the groove to face the same, and one of these discs may be provided with extensions or tabs 31 to position the rings in the mold. Two such discs are welded together through the parts 30 so as to form a unitary structure. Again the duplex disc is placed in the mold as in Figure 20 and the piston body cast therearound, so as to cause the aluminum to flow between the parts 29 and 30. After machining of the piston and forming of the groove, the parts 29 will protect the side walls of the groove.

In Figures 14 and 15, a single disc structure 10 is of channel form with a web 40, with the inside margins of the web recessed as shown at 32 and these recesses are again contracted towards the inner margin so as to form in effect dovetails with the piston metal cast therein. The disc structure is also provided with extensions or tabs 33 at spaced points along the disc to position the disc in the mold as in Figure 20; which tabs are pressed from the web leaving openings 41 in the web 40. After the piston has been cast over the ring, the machining of the ring is proceeded with as before and the web 41 of the channel-formed disc is cut away to protect the side walls of the groove. Upon cutting of the groove, the disc parts will be deflected towards and extending into the groove to face the same.

In Figures 16 and 17, the structure is generally the same as in Figures 14 and 15 except that in this embodiment the outside web 42 of the channel-formed disc is recessed along the outer margin of the disc structure as shown at 34 to permit the alloy to flow therethrough. Tabs or extensions 35 are spaced around the disc to position the disc in the mold, which tabs are pressed from the web 42 leaving additional openings 43 in the web. Upon machining of the piston and cutting of the groove, the side edges of the channel web will protect the groove the disc being deflected axially towards and extending into the groove to face the same.

In Figures 18 and 19, the disc is made up of two parts 10 each formed as shown and provided with closed recesses 36 therealong intermediate the margins of the disc structure, through which the alloy can flow and with extensions or tabs 37 pressed from the outside of the disc to position the duplex disc in the mold. Upon casting of the piston over the disc, and upon machining of the piston, the parts of the disc which extend into the packing ring-receiving groove are machined to form protectors for both side walls of the groove, the disc being deflected axially towards and extending into the groove to face the same.

In the various embodiments, each disc extends around the body and laterally, axially of the piston adjacent the groove and radially within the aluminum body, the outer margin of the disc extending into the groove to face the same, the disc having recesses extending circumferentially therealong and therethrough and the disc being formed to cause the aluminum to flow axially through said recesses and against the disc, the recesses being of sufficient dimensions circumferentially and radially of the disc to permit molten aluminum to flow therethrough and the recesses being positioned radially with respect to one of the margins of the disc and so formed that upon solidification the aluminum will shrink radially inwardly on the disc in order to cast-anchor the disc in said body.

In accordance with the various embodiments of this invention, a piston is provided in which the packing ring-receiving groove is faced with a metal harder than aluminum so as to protect the side walls. Such a piston will, therefore, withstand the hammering to which the face or faces of the ring groove is/or are subjected during the course of the repeated reciprocation of the piston when in use. The protector is firmly anchored in the piston body because of the fact that the aluminum flows through the recesses and surrounds the metal of the protector to such an extent that an effective anchoring is attained. The discs will not become loose because the recesses are so formed that upon solidification the aluminum will shrink radially inwardly and thus prevent the discs from moving radially outwardly. Thus in Figures 2, 10 and 14, the recesses are contracted radially inwardly; in Figures 4, 6, 8, 12 and 16, the recesses open to the outer margins; in Figure 6, the recesses are nearly closed; and in Figure 18, the recesses are closed and are intermediate the margins. The anchoring is such that as the piston shrinks after solidification, the protector is placed under tension, which tension is not relieved during use because the piston, when in use, never rises to the melting temperature of the aluminum.

Having thus described the invention, what is claimed and desired to be secured by Letters Patent is:

1. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to one of the margins of said disc and so formed that upon solidification the aluminum will shrink radially inwardly on said disc in order to cast-anchor said disc in said body.

2. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, one of the margins of said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to the outer margin of said disc and so formed that upon solidification the aluminum will shrink radially inwardly on said disc in order to cast-anchor said disc in said body.

3. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, the inner margin of said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to the outer margin of said disc and so formed that upon solidification the aluminum will shrink radially inwardly on said disc in order to cast-anchor said disc in said body.

4. A piston, comprising, an aluminum body provided with a packing ring-receiving groove, and a ferrous annular groove-facing disc, viz., of a metal harder than aluminum, anchored in the body laterally, axially of the piston and outside of the groove and whose outer margin extends laterally, axially of the piston and into the groove, said disc when in place being continuous along one of its margins and positioned radially within the aluminum body but interrupted to provide recesses of sufficient dimensions to permit flow of the aluminum therein and against said disc in order to anchor said disc in said body.

5. A piston, comprising, an aluminum body provided with a packing ring-rceiving groove, and a ferrous annular groove-facing disc, viz., of a metal harder than aluminum, anchored in the body outside of the groove and whose outer margin extends into the groove, said disc when in place being continuous along one of its margins and positioned radially within the aluminum body but interrupted intermediate its margin to provide recesses of sufficient dimensions to permit flow of the aluminum therein and against said disc in order to anchor said disc in said body.

6. A piston, comprising, an aluminum body provided with a packing ring-receiving groove, and a ferrous annular groove-facing disc, viz., of a metal harder than aluminum, anchored in the body laterally, axially of the piston and outside of the groove and whose outer margin extends laterally, axially of the piston and into the groove, said disc when in place being continuous along one of its margins and positioned radially within the aluminum body but interrupted along its other margin to provide recesses of sufficient dimensions to permit flow of the aluminum therein and against said disc in order to anchor said disc in said body.

7. A piston, comprising, an aluminum body provided with a packing ring-receiving groove, and a ferrous annular groove-facing disc, viz., of a metal harder than aluminum, anchored in the body laterally, axially of the piston and outside of the groove and whose outer margin extends laterally, axially of the piston and into the groove, said disc when in place being continuous along its inner margin and positioned radially within the aluminum body but interrupted along its outer margin to provide recesses laterally of the groove of sufficient dimensions to permit flow of the aluminum therein and around said inner margin in order to anchor said disc in said body.

8. A piston, comprising, an aluminum body provided with a packing ring-receiving groove, and a ferrous annular groove-facing disc, viz., of a metal harder than aluminum, anchored in the body laterally, axially of the piston and outside of the groove and whose outer margin extends laterally, axially of the piston and into the groove, said disc when in place being continuous along its outer margin and positioned radially within the aluminum body but interrupted along its inner margin to provide recesses of sufficient dimensions to permit flow of the aluminum therein and against said disc in order to anchor said disc in said body.

9. A piston, comprising, an aluminum body provided with a packing ring-receiving groove, and a pair of ferrous annular groove-facing discs, viz., of a metal harder than aluminum, anchored in the body laterally, axially of the piston and outside of the groove and whose outer margins extend laterally, axially of the piston and into the groove, each of said discs when in place being continuous along one of its margins and positioned radially within the aluminum body but interrupted to provide recesses of sufficient dimensions to permit flow of the aluminum therein and against said disc in order to anchor said discs in said body.

10. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, the outer margin of said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to the outer margin of said disc and so formed that upon solidification the aluminum will shrink radially inwardly on said disc in order to cast-anchor said disc is said body.

11. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, said disc having closed recesses radially intermediate said margins and extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to the outer margin of said disc and so formed that upon solidification the aluminum will shrink radially inwardly on said disc in order to cast-anchor said disc in said body.

12. A piston, comprising, an aluminum body provided with a packing ring-receiving groove, and an annular disc of a metal harder than aluminum and extending around said body axially adjacent said groove and radially within the aluminum body, the outer margin of said disc being deflected axially towards and extending into said groove to face the same, said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to one of the margins of said disc and so formed that upon solidification the aluminum will shrink radially inwardly on said disc in order to cast-anchor said disc in said body.

13. A piston, comprising, an aluminum body provided with a packing ring-receiving groove, and a pair of contiguous annular discs of a metal harder than aluminum and extending around said body axially adjacent said groove and radially within the aluminum body, the outer margin of each of said discs extending into said groove to face the same, said discs having recesses extending circumferentially therealong and therethrough and said discs being formed to cause the aluminum to flow axially through said recesses, said recesses being of sufficient dimensions circumferentially and radially of said discs to permit molten aluminum to flow therethrough and said recesses being positioned radially with respect to one of the margins of said discs and so formed that upon solidification the aluminum will shrink radially inwardly on said discs in order to cast-anchor said discs in said body.

14. A piston, comprising, an aluminum body provided with a packing ring-receiving groove, and an annular disc of a metal harder than aluminum and extending around said body axially adjacent said groove and radially within the aluminum body, the outer margin of said disc extending into said groove to face the same, said disc having recesses extending circumferentially therealong and therethrough and said disc being formed to cause the aluminum to flow axially through said recesses, said recesses being of sufficient dimensions circumferentially and radially of said disc to permit molten aluminum to flow therethrough and said recesses being positioned radially with respect to one of the margins of said disc and so formed that upon solidification the aluminum will shrink radially inwardly on said disc in order to cast-anchor said disc in said body, the outer margin of said disc extending radially beyond said body to locate said disc in a mold during casting of said body.

References Cited in the file of this patent

UNITED STATES PATENTS

| | | |
|---|---|---|
| 2,685,729 | Daub | Aug. 10, 1954 |

FOREIGN PATENTS

| | | |
|---|---|---|
| 455,539 | France | Dec. 13, 1913 |
| 548,400 | Great Britain | Oct. 8, 1942 |